(12) United States Patent
Whiteker et al.

(10) Patent No.: US 7,776,434 B2
(45) Date of Patent: *Aug. 17, 2010

(54) ORGANIC MATRIX COMPOSITE STRUCTURES AND THERMAL OXIDATIVE BARRIER COATING THEREFOR

(75) Inventors: Stephen Mark Whiteker, Covington, KY (US); Lisa Vinciguerra Shafer, Cincinnati, OH (US); Warren Rosal Ronk, West Chester, OH (US); Todd Aaron Bullions, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 157 days.

This patent is subject to a terminal disclaimer.

(21) Appl. No.: 11/965,964

(22) Filed: Dec. 28, 2007

(65) Prior Publication Data
US 2008/0213604 A1    Sep. 4, 2008

Related U.S. Application Data

(63) Continuation-in-part of application No. 11/928,274, filed on Oct. 30, 2007, which is a continuation-in-part of application No. 11/757,683, filed on Jun. 4, 2007, and a continuation-in-part of application No. 11/606,725, filed on Nov. 30, 2006, and a continuation-in-part of application No. 11/606,730, filed on Nov. 30, 2006, which is a continuation-in-part of application No. 11/383,079, filed on May 12, 2006, and a continuation-in-part of application No. 11/383,086, filed on May 12, 2006, and a continuation-in-part of application No. 11/383,092, filed on May 12, 2006, and a continuation-in-part of application No. 11/383,100, filed on May 12, 2006, and a continuation-in-part of application No. 11/383,104, filed on May 12, 2006.

(51) Int. Cl.
*B32B 5/30* (2006.01)
*B32B 9/04* (2006.01)
*B32B 27/06* (2006.01)

(52) U.S. Cl. ............ 428/323; 428/327; 428/331; 428/447; 428/451; 428/473.5

(58) Field of Classification Search ........... 428/451, 428/473.5, 323, 327, 331, 447
See application file for complete search history.

(56) References Cited

U.S. PATENT DOCUMENTS
5,178,964 A * 1/1993 Scola et al. ............ 428/473.5

* cited by examiner

*Primary Examiner*—D. S Nakarani
(74) *Attorney, Agent, or Firm*—Marcella R. Louke; William Scott Andes; General Electric Co.

(57) ABSTRACT

A tailorable polyimide resin system may be used to form an organic matrix composite (OMC) structure for use in high temperature applications. A thermal oxidative barrier coating on the OMC may include a bond coat comprising a tailorable polyimide resin system. The bond coat may include nanoparticles such as clay platelets, graphite flakes or a polyhedral oligomeric silsesquioxane. The coating system may include a thermal barrier layer including a silsesquioxane or an inorganic polymer. The tailorable polyimide resin system includes first and second independent prepolymer components able to impart desired properties in the prepolymer blend or the crosslinked polyimide matrix.

15 Claims, 1 Drawing Sheet

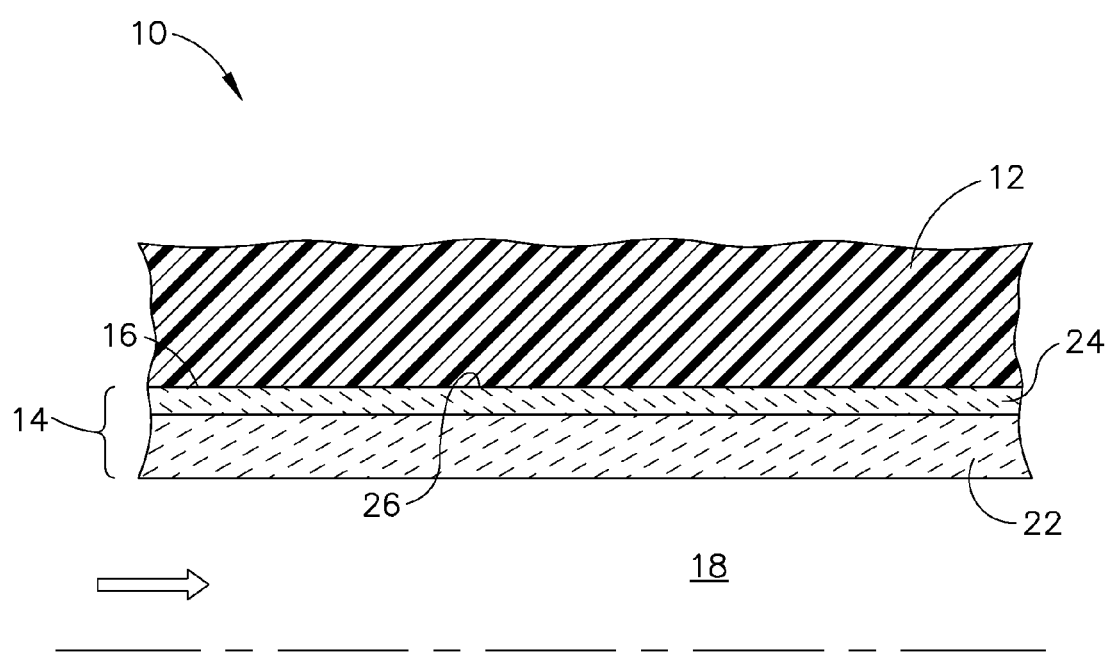

US 7,776,434 B2

ORGANIC MATRIX COMPOSITE STRUCTURES AND THERMAL OXIDATIVE BARRIER COATING THEREFOR

CROSS-REFERENCE TO RELATED APPLICATIONS

This application is a Continuation-in-Part of application Ser. No. 11/928,274 filed Oct. 30, 2007, which is a Continuation in Part of application Ser. No. 11/757,683 filed Jun. 4, 2007, which is a Continuation-in-Part of application Ser. Nos. 11/383,079, filed May 12, 2006; 11/383,086, filed May 12, 2006; 11/383,092, filed May 12, 2006; 11/383,100, filed May 12, 2006; 11/383,104, filed May 12, 2006; and also a Continuation-in-Part of application Ser. Nos. 11/606,725, filed Nov. 30, 2006; and 11/606,730, filed Nov. 30, 2006, all of which are incorporated herein by reference in their entirety.

BACKGROUND OF THE INVENTION

This invention relates generally to organic matrix composite structures coated with thermal oxidative barrier coatings.

Organic matrix composites (OMCs) such as PMR-15 and AFR-PE-4 are used in the aerospace industry for the weight reductions they offer when used to replace metal components. However, exposure to high temperature environments reduces mechanical properties and causes oxidative degradation of OMCs. Thus, improvements in high temperature properties of OMCs are sought.

One attempt to combat the problems encountered in the art is to build thicker parts. However, the increased thickness adds weight and cost to the component as compared to what could be achieved if thermal and oxidative effects on the component were reduced.

Another attempt utilizes a sacrificial layer on the component to retard material degradation. The sacrificial layer may be a thin carbon veil impregnated with the OMC resin. However, the protection provided by the sacrificial layer is lost over time.

Another approach is to formulate polyimide resins for use in OMCs to improve the service capabilities. However, polyimide resins generally present processing challenges and health concerns. In particular, partially unreacted solutions of a commercially available polyimide, PMR-15, include 4,4'-methylenedianiline (MDA), a known carcinogen and liver and kidney toxin.

Currently, there are investigations into the use of ceramic fillers carried in polyimide matrices applied as a thermally sprayed coating for OMC components. The coating purports to improve the environmental durability and erosion resistance of the organic matrix composites. However, the thermal spraying process raises environmental, health, safety, energy, and labor issues. Additionally, it is difficult to provide a fully-cured coating system during a thermal spraying deposition process.

Accordingly, it would be desirable to improve the high temperature performance of components comprising OMCs by providing a substrate/coating system with a two-pronged approach. The first prong is to provide a resin system for use in OMCs that overcomes current challenges. The second prong is to provide a compatible coating system for the OMC that improves thermal oxidative stability and mechanical performance.

BRIEF DESCRIPTION OF THE INVENTION

The above-mentioned needs may be met by exemplary embodiments that provide a tailorable polyimide resin system that may be utilized as an OMC substrate. Additionally, a tailorable polyimide resin system may be utilized in a thermal oxidative barrier coating system for OMC substrates. Thus, coated structures formed of high temperature OMC materials could be used, for example, as replacements for metallic components in environments having temperatures greater than the maximum operating temperatures of the unmodified high temperature OMC materials.

In an exemplary embodiment, an article comprises an organic matrix composite substrate; and a thermal oxidative barrier coating on at least one surface of the substrate. The organic matrix composite substrate comprises a first polyimide matrix formed by curing under suitable cure conditions, a polyimide precursor blend comprising a first prepolymer component and a second prepolymer component, wherein the first and second prepolymer components independently comprise a monomeric mixture, a reaction product of a monomeric mixture, or a combination thereof. Each monomeric mixture includes a diamine component, a dianhydride component, and an end group component. The thermal oxidative barrier coating includes at least a bond coat disposed on the at least one surface of the substrate and at least one thermal barrier layer substantially overlying the bond coat. The bond coat comprises nano-particles carried in a second polyimide matrix. The at least one thermal barrier layer comprises at least one member selected from the group consisting of a silsesquioxane and an inorganic polymer.

BRIEF DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

FIG. 1 illustrates a portion of a component including a substrate having a thermal oxidative barrier coating thereon.

DETAILED DESCRIPTION OF THE INVENTION

Referring to the drawing, FIG. 1 shows a component 10 for particular use in high temperature environments such as a gas turbine engine, although other applications are contemplated within the scope of the invention. Component 10 includes a substrate 12 and a thermal oxidative barrier coating system 14 on at least a first surface 16. First surface 16 is situated on the "hot side" 18 of component 10. The service temperature on the hot side 18 of component 10 may be up to about 725° F. (385° C.).

An exemplary embodiment contemplates the use of a thermal oxidative barrier coating for high temperature OMCs in turbine engine applications. The thermal oxidative barrier coating can be applied to at least the hot side of a composite part to reduce the maximum temperature exposure of the underlying substrate and form a barrier to oxidation of the structural composite matrix.

An exemplary embodiment utilizes a tailorable polyimide resin system to form a high temperature organic matrix composite (OMC) substrate. The tailorable polyimide resin system is able to provide excellent mechanical thermal properties, such as high Tg and thermal oxidative stability (TOS).

In an exemplary embodiment, a compatible coating system is provided for the OMC. The coated composite structure may be utilized, for example, to form ducts for defining various flow paths through a gas turbine engine. The coated structure may be utilized in other high temperature applications such as liners, tubes, flaps, airfoils, and frames.

Thermal protection systems in the form of thermal barrier coatings (TBCs) have been used with metals for many years. In such cases, low thermal conductivity materials are coated on the surface of the part to create a thermal gradient between the service environment and the part such that the subsurface material is not exposed to a temperature above its maximum use temperature. However, OMCs present features and challenges that are separate and unique from metallic substrates. Thus, the coatings disclosed herein are termed "thermal oxidative barrier coatings" to distinguish them from thermal barrier coatings used for metallic substrates.

In an exemplary embodiment, the OMC matrix material is formed from a tailorable polyimide resin system comprising a blend of at least a first prepolymer component and a second prepolymer component. In an exemplary embodiment, the first and second prepolymer components are utilized to impart various mechanical, chemical, and thermal properties to the cured (crosslinked) polyimide matrix. The first and second prepolymer components may be blended in a proportion to provide desired properties in the prepolymer resin blend and in a cured polyimide product. Properties that may be varied with the ratio of blending include, but are not limited to, thermal oxidative stability, molecular weight, glass transition temperature, and melt viscosity of the prepolymer resin blend.

In an exemplary embodiment, a tailorable polyimide resin system includes a prepolymer blend comprising a first prepolymer component and a second prepolymer component. In an exemplary embodiment, the first prepolymer component comprises a first monomeric mixture, a reaction product of a first monomeric mixture, or combinations thereof. The second prepolymer component is different from the first prepolymer component, and comprises a second monomeric mixture, a reaction product of a second monomeric mixture, or combinations thereof. The first and second monomeric mixtures each include a diamine component comprising one or more diamines or derivatives thereof; a dianhydride component comprising one or more dianhydrides or derivates thereof; and one or more end groups or derivatives thereof, as will be appreciated by those with skill in the art.

In an exemplary embodiment, the first prepolymer component may include at least a first polyimide oligomer having the formula $E_1\text{-}[R_1]_n\text{-}E_1$; wherein $R_1$ and comprises the following structure:

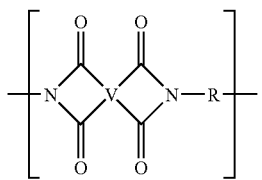

wherein n comprises from about 1 to about 5, wherein V is a tetravalent substituted or unsubstituted aromatic monocyclic or polycyclic linking structure, R is a substituted or unsubstituted divalent organic radical, and $E_1$ comprises one or more crosslinkable functional groups.

In an exemplary embodiment, the second prepolymer component may comprise a second polyimide oligomer having a formula similar to the first polyimide oligomer. However, in order to achieve a random arrangement of repeat units along the polyimide polymer backbone, at least one of the monomeric units forming the oligomer must be different. It is believed that the random arrangement of repeat units along the polymer backbone contributes to a decrease in microcracking in the crosslinked polyimide matrix at elevated temperatures, as compared to known homopolymeric systems.

An exemplary thermal oxidative barrier coating system 14 may include an outer thermal barrier layer 22 and a bond coat 24. In addition to bonding the outer thermal barrier layer 22, the bond coat 24 may additionally function as an oxidation barrier. In an exemplary embodiment, because the bond coat 24 is protected by the thermal barrier layer 22, the polymer matrix of the bond coat 24 may be the same as, or similar to, the polymer matrix of the substrate 12.

In an exemplary embodiment, the materials contemplated for use as the thermal barrier layer 22 are evaluated for thermal conductivity, coefficient of thermal expansion (CTE), thermal stability measured as a function of weight loss, specific gravity, and flexural strength and modulus. In an exemplary embodiment, it is desired to minimize the difference between the CTE of substrate 12 and the CTE of the thermal barrier layer 22. For example, the CTE of the OMC substrate may be in the range of about 1 ppm/° F. (1.8 ppm/° C.), while the CTE of exemplary thermal barrier layers may be in the range of about 3.5 to 6 ppm/° F. (6.3 to 10.8 ppm/° C.). In exemplary embodiments, the desired density of the thermal barrier layer 22 is equal to or less than the density of the OMC substrate 12. However, the maximum allowable density is generally dependent on the thermal conductivity of the material. The thermal conductivity of the thermal barrier layer influences the thickness necessary to realize the required thermal benefit.

In an exemplary embodiment, the coating thickness is sufficient to provide a reduced temperature at the substrate/coating interface 26 of at least 100° F. (56° C.). Thus, in an exemplary embodiment, if the service temperature is approximately 725° F. (385° C.), the temperature exposure at the substrate/coating interface 26 is approximately 625° F. (329° C.), or less. In an exemplary embodiment, the coating system 14 comprises a thickness of about 0.030 inches (0.76 mm) to about 0.060 inches (1.5 mm). It is believed that coated organic matrix composite substrates may be used in higher service temperatures, i.e., greater than 725° F. (385° C.), using the methods and coatings disclosed herein.

In an exemplary embodiment, thermal barrier layer 22 may include a two-part silsesquioxane/titanate material. Silsesquioxanes are represented by the generic formula $(RSO_{1.5})_n$ wherein each silicon atom is bound to an average of one and a half (sesqui) oxygen atoms and to one hydrocarbon group (ane). Silsesquioxanes can exist in the form of polycyclic oligomers, ladder, and linear polymers. Such coatings reportedly strongly adhere to various substrates including thermoset OMCs. An exemplary two-part coating system cures at 50° F. to 100° F. (10-38° C.). The material is resistant to acids and bases, and has a maximum continuous use temperature of 2000° F. (1093° C.). The CTE of the coating variations range from about 3.5 to 5 ppm/° F. (6.3 to 9 ppm/° C.) and have a thermal conductivity of as low as 0.15 W/m·K at 560° F. (293° C.).

In other embodiments, an exemplary thermal barrier layer 22 may comprise a poly(sialate) material. Poly(sialates) are one general class of inorganic polymers with the base structure of (—Si—O—Al—O—). The actual structure and properties of the poly(sialate) depend on the atomic ratio of Si to Al. The CTE is typically around 5 ppm/° F. (9 ppm/° C.) for the neat resin and is tailored by the addition of fillers. A fully cured and dried cast sample is able to withstand 1650° F. (899° C.) before significant loss of strength due to phase transformation. Published data for an unfilled poly(sialate) shows a thermal conductivity ranging from 0.2 to 0.4 W/m·K.

In an exemplary embodiment, the bond coat 24 may comprise a polyimide matrix containing nano-particles. Exemplary nano-particles include polyhedral oligomeric silsesquioxane, graphite flake, and clay platelets. The respective amounts of polyimide and nano-particles are determined by factors such as processability, CTE, oxygen barrier capability, and bond strength.

In an exemplary embodiment, the polyimide matrix of the bond coat 24 may be formed of a tailorable polyimide resin system as described above. For example, the tailorable polyimide resin system, including the first and second prepolymer components may further include fillers such as exfoliated nano-clay, exfoliated graphite flake, and/or polyhedral oligomeric silsesquioxane nanofiller.

Processability is measured as a function of the system's viscosity and uniformity of particle distribution. Viscosity versus temperature profiles are evaluated for coating processability. Filler dispersion is measured by various diffractometry and microscopy methods. CTE is measured via dilatometry over the temperature range of −65° F. to 800° F. (−53° C. to 426° C.).

Resistance to oxygen penetration is measured via oxygen diffusivity measurements on films formed from the selected formulation. Coated OMC substrate samples are exposed to thermal oxidative environments for evaluation of thermal protection. For example, a thermal oxidative stability test includes placing samples in a chamber through which a constant flow of air travels at a rate sufficient to refresh the chamber volume at a rate of 5 times/hour. The test temperature, pressure, and time is chosen to result in a measurable degradation of unprotected OMC substrate samples. Oxygen barrier capability of the coating is determined by the weight loss of protected OMC substrates relative to unprotected substrates. Although the primary role of the bond coat 24 is to adhere the thermal barrier outer layer 22, oxygen barrier capability is a secondary benefit.

Bond strength is tested at room temperature and at elevated temperature. Initial bond strength evaluation focuses on the adhesion at the bond coat layer/thermal barrier layer interface. Bond strength is measured via flatwise tensile tests.

The tailorable polyimide resin system for the OMC substrate may comprise a prepolymer blend having a first prepolymer component and a second prepolymer component. The first prepolymer component includes compounds having the following formula (I):

$$E_1\text{-}[R_1]_n\text{-}E_1 \quad (I)$$

The second prepolymer component includes compounds having one or more of the following formula (II) and (III):

$$E_2\text{-}[R_2]_n\text{-}E_2 \quad (II); \text{ or}$$

$$M_1 \quad (III)$$

wherein n is from about 1 to about 1000 structural units or more. The repeating structural units may also include from about 10 to about 750 structural units or from about 50 to about 500 structural units. $R_1$ and $R_2$ in each formulas (I) or (II) independently include groups having the following formula (IV):

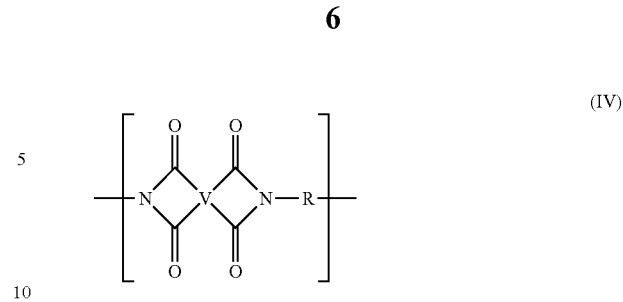

wherein V is a tetravalent substituted or unsubstituted aromatic monocyclic or polycyclic linking structure, preferably including from about 5 to about 50 carbon atoms. Substitutions in the linking structures may include, but are not limited to ethers, epoxides, amides, esters and combinations thereof. Exemplary linking structures suitable for use as V in formula (IV) include the following formulas:

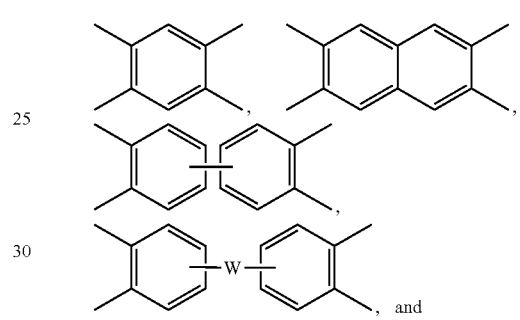

, and combinations thereof, wherein W is a divalent moiety selected from the group consisting of —O—, —S—, —C(O)—, —SO$_2$—, —SO—, —C$_y$H$_{2y}$— (y being an integer from 1 to 5), and halogenated derivatives thereof. In addition, W may include a moiety selected from the group consisting of —O—, —O—Z—O—, wherein the divalent bond of the —O—, and of —O—Z—O— group are in the 3,3', 3,4', 4,3' or the 4,4' positions. Z includes, but is not limited to aromatic divalent radicals having the following formulas:

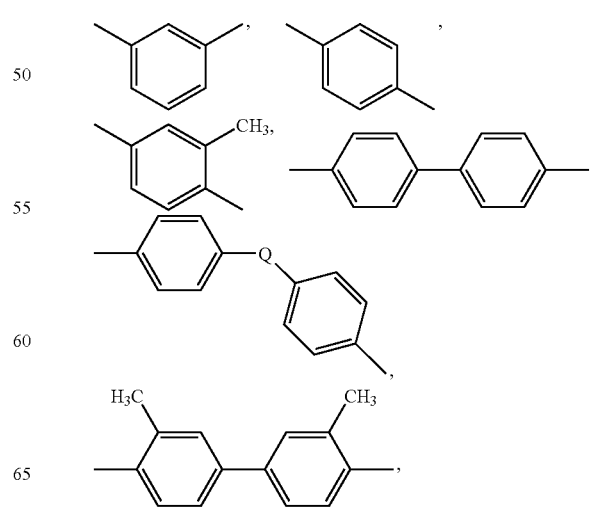

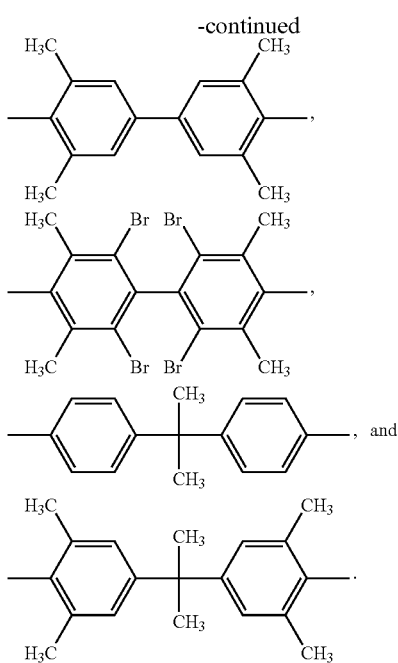

R, shown in the above formula (IV) includes, but is not limited to substituted or unsubstituted divalent organic radicals such as aromatic hydrocarbon radicals having about 6 to about 20 carbon atoms and halogenated derivatives thereof, straight or branched chain alkylene radicals having about 2 to about 20 carbon atoms, cycloalkylene radicals having about 3 to about 20 carbon atoms or divalent radicals having the following formula:

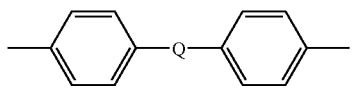

wherein Q in the above formulas includes, but is not limited to divalent moieties selected from —O—, —S—, —C(O)—, —SO2-, —SO—, —CyH2y- (y being an integer from 1 to 5), and halogenated derivatives thereof.

End groups E1 and E2 in each of the first and second prepolymer components, independently, include groups that are capable of forming oligomer compounds with R1 and/or R2, as defined above and capable of crosslinking in an addition polymerization reaction to form a crosslinked polyimide structure. End group structures may include, but are not limited to at least one of the following end group containing structures:

nadic end groups, including, but not limited to the following formula:

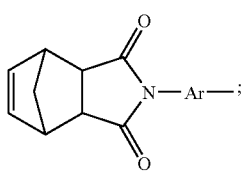

vinyl end groups including, but not limited to the following formula:

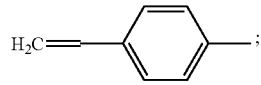

acetylene end groups including, but not limited to the following formula:

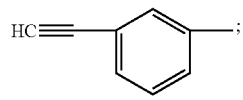

phenylethynyl end groups including, but not limited to the following formula:

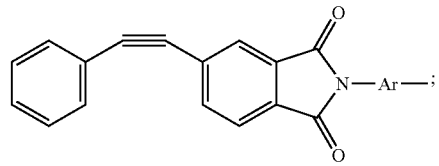

and mixtures thereof.

Ar as shown above in the nadic and phenylenthynyl end group structures may include aromatic groups, such as substituted or unsubstituted aromatic monocyclic or polycyclic linking structures. Substitutions in the linking structures may include, but are not limited to ethers, epoxides, amides, esters and combinations thereof.

An exemplary oligomer structure for use as the first and/or second prepolymer components includes the formula (V) as R1 and/or R2:

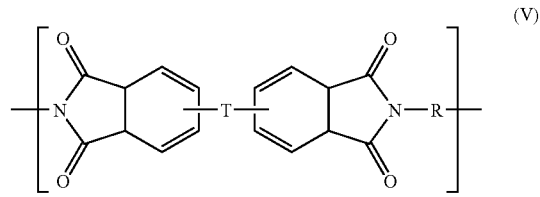

wherein T may include, but is not limited to ethers, epoxides, amides, ketones, esters and combinations thereof. An exemplary structure for the first and/or second prepolymer components having structure (V) include the formula wherein T is a —C(O)— group and R has the following formula:

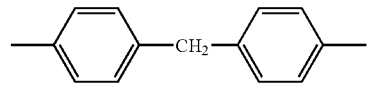

and wherein E1 and E2 each have the following formula:

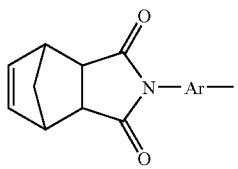

While the second prepolymer component may be an oligomer structure, as discussed above, the second prepolymer component may also include a mixture of monomer components, as shown above where formula (III) includes a monomer mixture. The M1 monomer mixture includes components capable of forming polyimide prepolymers having an end-capped oligomer structure and/or a crosslinked polyimide polymer or copolymer. M1 preferably includes a diamine, a dianhydride and an end-blocking agent having a crosslinkable group.

The diamine component of the M1 may include, but is not limited to, an aromatic diamine monomer having the following formula (VI):

$$H_2N-Ar-NH_2 \quad (VI)$$

Ar as used in the formula (VI) preferably includes aromatic compounds, including substituted aromatic compounds and compounds having multiple aromatic rings. Substituent groups for substitution in the Ar group may include any suitable functional group, including, but not limited to halogen groups, alkyl groups, alkoxy groups, and combination thereof.

Examples of suitable diamine components may include, but are not limited to: 1,3-bis(aminophenoxy)benzene, 1,4-bis(aminophenoxy)benzene, p-phenylenediamine, ethylenediamine, propylenediamine, trimethylenediamine, diethylenetriamine, triethylenetetramine, hexamethylenediamine, heptamethylenediamine, octamethylenediamine, nonamethylenediamine, decamethylenediamine, 1,12-dodecanediamine, 1,18-octadecanediamine, 3-methylheptamethylenediamine, 4,4-dimethylheptamethylenediamine, 4-methylnonamethylenediamine, 5-methylnonamethylenediamine, 2,5-dimethylhexamethylenediamine, 2,5-dimethylheptamethylenediamine, 2,2-dimethylpropylenediamine, N-methyl-bis(3-aminopropyl)amine, 3-methoxyhexamethylenediamine, 1,2-bis(3-aminopropoxy)ethane, bis(3-aminopropyl)sulfide, 1,4-cyclohexanediamine, bis-(4-aminocyclohexyl)methane, m-phenylenediamine, 2,4-diaminotoluene, 2,6-diaminotoluene, m-xylylenediamine, p-xylylenediamine, 2-methyl-4,6-diethyl-1,3-phenylene-diamine, 5-methyl-4,6-diethyl-1,3-phenylene-diamine, benzidine, 3,3"-dimethylbenzidine, 3,3"dimethoxybenzidine, 1,5-diaminonaphthalene, bis(4-aminophenyl)methane, bis(2-chloro-4-amino-3,5-diethylphenyl)methane, bis(4-aminophenyl)propane, 2,4-bis(b-amino-t-butyl)toluene, bis(p-b-amino-t-butylphenyl)ether, bis(p-b-methyl-o-aminophenyl)benzene, bis(p-b-methyl-o-aminopentyl)benzene, 1,3-diamino-4-isopropylbenzene, bis(4-aminophenyl)sulfide, bis(4-aminophenyl)sulfone, bis(4-aminophenyl)ether, 1,3-bis(3-aminopropyl)tetramethyldisiloxane and mixtures comprising at least one of the foregoing organic diamines. Exemplary organic diamines include meta-phenylene diamine and para-phenylene diamine.

Further, these diamines are also usable in place of some or all of the hydrogen atoms on one or more of the aromatic ring(s) of each of the diamines. A like number of ethynyl groups, benzocyclobuten-4'-yl groups, vinyl groups, allyl groups, cyano groups, isocyanate groups, nitrilo groups and/or isopropenyl groups, which can act as crosslinking points, may also be introduced as substituent groups on the aromatic rings, preferably to an extent not impairing the moldability or formability.

The dianhydride component of the polyimide monomer may include, but is not limited to, monomers having an anhydride structure, wherein an exemplary structure includes a tetracarboxylic acid dianhydride structure. The dianhydride component employed may be any suitable dianhydride for forming crosslinkable or crosslinked polyimide prepolymer, polymer or copolymer. For example, tetracarboxylic acid dianhydrides, singly or in combination, may be utilized, as desired.

Illustrative examples of aromatic dianhydrides suitable for use in M1 of the second prepolymer component include: 2,2-bis(4-(3,4-dicarboxyphenoxy)phenyl)propane dianhydride; 4,4'-bis(3,4-dicarboxyphenoxy)diphenyl ether dianhydride; 4,4'-bis(3,4-dicarboxyphenoxy)diphenyl sulfide dianhydride; 4,4'-bis(3,4-dicarboxyphenoxy)benzophenone dianhydride; 4,4'-bis(3,4-dicarboxyphenoxy)diphenyl sulfone dianhydride; 2,2-bis(4-(2,3-dicarboxyphenoxy)phenyl)propane dianhydride; 4,4'-bis(2,3-dicarboxyphenoxy)diphenyl ether dianhydride; 4,4'-bis(2,3-dicarboxyphenoxy)diphenyl sulfide dianhydride; 4,4'-bis(2,3-dicarboxyphenoxy)benzophenone dianhydride; 4,4'-bis(2,3-dicarboxyphenoxy)diphenyl sulfone dianhydride; 4-(2,3-dicarboxyphenoxy)-4'-(3,4-dicarboxyphenoxy)diphenyl-2,2-propane dianhydride; 4-(2,3-dicarboxyphenoxy)-4'-(3,4-dicarboxyphenoxy)diphenyl ether dianhydride; 4-(2,3-dicarboxyphenoxy)-4'-(3,4-dicarboxyphenoxy)diphenyl sulfide dianhydride; 4-(2,3-dicarboxyphenoxy)-4'-(3,4-dicarboxyphenoxy)benzophenone dianhydride and 4-(2,3-dicarboxyphenoxy)-4'-(3,4-dicarboxyphenoxy)diphenyl sulfone dianhydride, 1,2,4,5-benzenetatracarboxylic dianhydride as well as mixtures comprising one of the foregoing dianhydrides.

Exemplary anhydride components include the following dianhydride compounds:

3,4,3',4'-biphenyltetracarboxylic dianhydrides having the following formula:

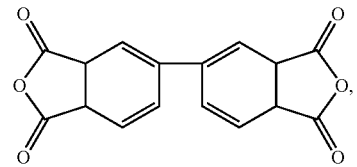

3,4,3',4'-benzophenonetetracarboxylic dianhydrides having the following formula:

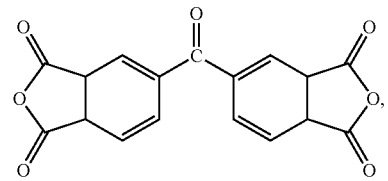

2,2-bis(3',4'-dicarboxyphenyl)hexafluoropropane dianhydrides having the following formula:

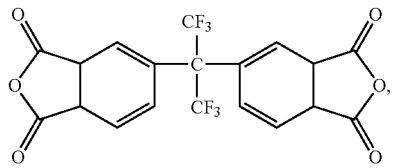

pyromellitic dianhydrides having the following formula:

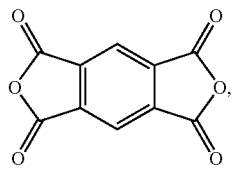

and mixtures thereof.

An exemplary dianhydride component includes dimethyl ester of 3,3',4,4'-benzophenone tetracarboxylic acid.

Depending on the fabrication process, tetracarboxylic acid monoanhydrides, tetracarboxylic compounds other than anhydrides, or their derivatives such as salts may also be used as desired instead of the above-recited dianhydrides. The dianhydride components, as described above, may be used either singly or in combination as needed.

The aromatic dianhydrides can be prepared by any suitable fabricating method known in the art. One suitable fabrication method for fabricating aromatic dianhydrides may include hydrolysis, followed by dehydration, of the reaction product of a nitro substituted phenyl dinitrile with a metal salt of dihydric phenol compound in the presence of a dipolar, aprotic solvent.

End-group compounds of the M1 group may include structures that are capable of forming oligomer compounds with the $R_1$ and/or $R_2$, as defined above and capable of crosslinking in an addition polymerization reaction to form a crosslinked polyimide structure. Crosslinkable-group-containing end blocking agents of various kinds are usable depending on the synthesis process of the polyimide, including monoamines and dicarboxylic acid anhydrides as representative examples. A variety of crosslinkable groups may be selected in accordance with molding or forming conditions.

The crosslinkable group structures contained in the end groups may include ethynyl groups, benzocyclobuten-4'-yl groups, vinyl groups, allyl groups, cyano groups, isocyanate groups, nitrilo groups, amino groups, isopropenyl groups, vinylene groups, vinylidene groups, and ethynylidene groups.

The above described, crosslinkable-group-containing end blocking agents can be used either singly or in combination. Some or all of the hydrogen atoms on one or more of the aromatic rings of the end group containing material may be replaced by a like number of substituent groups selected from halogen groups, alkyl groups, alkoxy groups, and combinations thereof.

Exemplary end group structures may include, but are not limited to, at least one the following end group containing structures: monomethyl ester of 5-norbornene-2,3-dicarboxylic acids, including, but not limited to, the following formula:

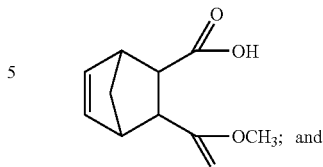

4 phenylethynyl phthalic anhydrides including, but not limited to the following formula:

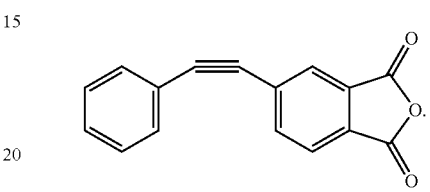

In one embodiment, the first prepolymer component is provided in solid form and the second prepolymer component is provided as a monomeric mixture including a diamine component, a dianhydride component, and an end group component. Particularly suitable solid forms include, but are not limited to, powders which are easily dispersed and/or dissolved in the monomeric solution.

The above components, including the first prepolymer component and the second prepolymer component, may be fabricated using any known methods. Suitable methods for forming the first prepolymer components include reacting substantially equimolar amounts of dianhydride and diamine and a termination agent in a high boiling aprotic solvent under imidification conditions to form an insoluble prepolymer. The process is not limited to use of an aprotic solvent and may include any solvent composition suitable for reacting the monomer components (i.e., the dianhydride, the diamine and the termination agent).

Another embodiment includes providing a first prepolymer component and a second prepolymer component in a predetermined ratio and blending the components together in a ratio suitable to provide desired properties in the prepolymer mixture and in the cured polyimide product. Properties that may be varied with the ratio of the blending include, but are not limited to thermal oxidative stability, molecular weight, glass transition temperature, and melt viscosity of the prepolymer mixture.

Molecular weight (MW) for the prepolymer components is utilized in providing a prepolymer mixture and a crosslinked polyimide material having the desired properties. In one embodiment, powder resin having a MW of about 700-2500 g/mol is provided as a prepolymer component. The final blends ratio in this embodiment is 10-60% by weight based on imidized solids of resin blend. In another embodiment, liquid resin having a MW of about 1,000-2,500 g/mol is provided as a prepolymer component. The liquid composition includes 20-60% imidized solids as a solution in either ethanol or methanol comprising ethyl ester or methyl esters of the prepolymer components. In either the powder or liquid mixtures, the MW of the individual components may be individually selected to provide desired properties, such as MW, glass transition temperature and/or thermal oxidative stability in the prepolymer mixture and in the cross-linked polyimide resin. In another embodiment, a powder prepolymer component is mixed with a liquid prepolymer component. One mixture includes a larger difference in MW between prepolymer components, a lower MW powder mixed with a higher molecular weight liquid. Specifically, a powder prepolymer component having a MW of 800 g/mol is mixed with a liquid prepolymer component having a MW of 2,100 g/mol, constituting a 20 wt % powder prepolymer to 80 wt % liquid prepolymer. Another mixture includes a smaller difference in MW between prepolymer components. Specifically, a powder prepolymer component having a MW of 990 g/mol is mixed with a liquid prepolymer component having a MW of 1,600 g/mol, constituting a 30 wt % powder prepolymer to 70 wt % liquid prepolymer.

Glass transition temperature (Tg) is a measure of the ability of the polymer to maintain properties at elevated temperatures. Because bulk motion of the polymer is restricted below the Tg, the higher the Tg a material displays, typically, the higher the temperature capability of that material. This is, however, a measure of the temperature capabilities of the material over only short times at high temperatures.

Melt viscosity is a measure of a fluids resistance to flow at temperatures above the melt point. For processing composites, it is generally desirable to have melt viscosities below 100,000 centipoise (cps) with the preferred range or 40,000 cps-800 cps wherein the melt viscosity is dependent upon the processing utilized. If the melt viscosity is not sufficiently low, processing requires excessive pressures in order to make the resin flow. Lower melt viscosities generally lead to greater processing options due to decreased pressure needs.

Thermal Oxidative Stability (TOS) is the ability of the polymer to withstand elevated temperatures in an oxygen-containing environment, such as air, with minimal loss of weight and/or properties. Turbine engine components often operate in high pressure as well as high temperature environments and the high pressure acts to increase the concentration of oxygen accelerating the deterioration of composite properties. Since, in a composite, compression strength is a resin-dominated property, the retention of compression strength after long-time exposures to high temperatures is monitored as a measure of TOS. Weight loss over time is also used as a measure. Polymers degrade through mechanisms, such as volatilization, resulting in a composite having reduced mass due to this loss of polymer. One test used herein to measure TOS includes placing a plaque of polymeric or composite material in a chamber, increasing the temperature and pressure within the chamber to a predetermined temperature and pressure, and holding these conditions for up to 150 hrs with multiple atmospheric changes over the course of the test. The plaques are then removed and tested for weight loss and retention of compression strength. The weight loss and retention of compression strength reflect service conditions in a turbine engine and provide a measure of the longer-term stability of the polymer material. A higher TOS is important for material that will be placed in a high temperature environment for long periods of time. The crosslinked polyimide copolymer preferably has a TOS of less than about 2.0% weight loss.

In an exemplary embodiment, a prepolymer blend comprises a first prepolymer component including at least a dianhydride component, a diamine component and an end group component. In an exemplary first prepolymer component, the dianhydride component includes at least 2,3-3',4'-biphenyltetracarboxylic dianhydride ("a-BPDA"). The diamine component may include at least an amino phenoxy benzene ("APB"), such as 1,3-bis(aminophenoxy)benzene or 1,4-bis(aminophenoxy)benzene, and metaphenylene diamine (meta-PDA). The first prepolymer component may include an end group such as a phenyl ethynyl phthalic anhydride ("PEPA"). An exemplary formulation for the first prepolymer component, known as PETI® 330, is commercially available from UBE America (New York, N.Y.). PETI 330 has a published Tg of 330° C./630° F. Other PETI-type formulations may be utilized. It is believed that use of other PETI-type formulations may affect properties of the prepolymer blend, as well as properties, such as Tg, of the polyimide formed from the cured blend.

In an exemplary embodiment, the second prepolymer component includes at least a dianhydride component, a diamine component, and an end group component. At least one of the dianhydride component, the diamine component, or the end group component in the second prepolymer component is different from the dianhydride component, the diamine component, or the end group component in the first prepolymer component.

In the second prepolymer component, the dianhydride component may include at least a pyromellitic dianhydride ("PMDA"), BPDA, and BTDA. The diamine component may include at least para-PDA, and APB. The second prepolymer component may include an end group agent such as PEPA. An exemplary formulation for the second prepolymer component is known as AVIMID® RB, a thermoset polyimide resin from Cytec Industries. AVIMID® RB has a published Tg of 644° F./340° C.

In an exemplary embodiment, the molar ratio of the first prepolymer component to the second prepolymer component is selected based on the desired properties of the prepolymer blend, the crosslinked polyimide matrix, or a combination thereof. For example, a first molar ratio may provide a desired melt viscosity of the blend that is appropriate for a chosen processing technique. A different molar ratio may be chosen if the desired property is a higher Tg of the crosslinked polyimide matrix.

In an exemplary embodiment, the molar ratio of the first prepolymer component to the second prepolymer component may range from about 10:90 to about 40:60.

In exemplary embodiments, the first prepolymer component is provided as a powder and the second prepolymer component is provided as a mixture of monomers. In other exemplary embodiments, the first and second prepolymer components are provided as powders. In other exemplary embodiments, the first and second prepolymer components are provided as independent monomeric mixtures.

In an exemplary embodiment, a pre-imidized powder is utilized as the first prepolymer component. In an exemplary embodiment the powder comprises a reaction product of end group component, such as, but not limited to, NE, a dianhydride component, including BTDA, and a diamine component including at least metaphenylene diamine (meta-PDA) and Bis-M. An exemplary second prepolymer component comprises a mixture of monomers. For example, the second prepolymer component can include a dianhydride component including at least a mixture of BPDA and BTDA, a diamine component including at least pPDA and Bis-M, and an end group component, such as, but not limited to NE. In an exemplary embodiment, the diamine component of the second prepolymer component may further include a substitution of APB for a portion of the Bis-M. In an exemplary embodiment, up to about 10 mol % substitution of APB for Bis-M in the mixture of monomers is contemplated within the scope of the invention.

In an exemplary embodiment, the prepolymer blend exhibits prepolymer properties such as melt viscosity and molecular weight. These properties may be varied depending on the respective amounts of the first and second prepolymer components present in the blend. In certain applications, the prepolymer property may be a foremost consideration in selecting the first and second prepolymer components and their relative amounts in the prepolymer blend.

In an exemplary embodiment, the crosslinked polyimide matrix exhibits crosslinked properties such as thermal oxidative stability, glass transition temperature, molecular weight, and void content. These post-cure properties may also be varied depending on the respective amounts of the first and second prepolymer components present in the blend, prior to cure.

Other exemplary properties of the prepolymer blend, or the crosslinked polyimide matrix that may be varied include imidization temperature, maximum cure temperature, molecular weight distribution, tack, drape, ability to process using film infusion, ability to process using RTM, ability to modify the prepolymer blend with fillers or other agents, tensile strength, compression strength, inplane shear, and wet properties.

In an exemplary embodiment, a prepolymer blend comprising a first prepolymer component which may comprise a polyimide oligomer and a second prepolymer component that may comprise a polyimide oligomer, a mixture of monomers, or combination thereof, can be used as a roadmap to determine relative amounts of monomers to use in a "one pot" blend.

For example, the first prepolymer component may include a preimidized reaction product of a first blend of monomers. The second prepolymer component may include a preimidized reaction product, a blend of monomers, M, or a combination thereof. The properties of the prepolymer blends, i.e., melt viscosity, can be measured and optimized. Properties of the crosslinked polyimides, i.e., Tg, formed from curing the blends can be determined. After achieving desired outcomes in the prepolymer blends or crosslinked matrices, the theoretical molar ratio of monomer starting agents (generally dianhydrides, diamines, and end groups) can be determined from the ratios of the prepolymer components used. The monomers can then be imidized in a "one-pot" process for use as a neat resin, molding compound, film, prepreg, etc. Thus, cycle time for optimizing resin blends can be greatly reduced. Subsequent prepolymer blends can then be formulated from the monomers themselves.

In other embodiments, prepolymer blends may include a plurality of preimidized reaction products. The preimidized reaction products may be blended in various ratios to optimize desired outcomes.

Using the processes described above, prepolymer blends can be readily tailored to provide desired property outcomes in the blends and the crosslinked matrices.

An exemplary embodiment, the OMC substrate is formed by utilizing the prepolymer blends in a resin infusion (RI) process. In RI, a fiber containing preform is typically placed on a mold or other surface capable of providing the cured material with the desired geometry. A preferred fiber, particularly for aerospace applications, is carbon fiber. The fiber reinforcement of the preform is not limited to carbon fiber and may include any suitable fiber having high strength, sufficient stiffness, and relatively low density. The fiber for impregnation may be a fiber in any suitable form including, but not limited to uniaxial, braided, multi-layered, or woven forms. In addition, the fibers may be continuous fibers, chopped fiber, braided fiber, fiber fabric, woven fibers and noncrimp fabric, unitape fiber, fiber film or any suitable form of fiber that results in a reinforced composite material when cured. In addition, multiple types of fibers may be utilized in the preform.

An exemplary prepolymer blend may be placed as a film layer or layers on or within intermediate layers of the reinforcing fiber preform to cover all or a majority of the preform. Alternatively, a film material, including the prepolymer blend, may be provided as at least a portion of the preform, wherein the material provided includes fibers onto which the resin blend has been placed into contact. The prepolymer blend resin material may be applied onto the entire surface of the reinforcing fiber preform. Alternatively, the matrix material may be interleaved between layers of the preform to cover all the layers of reinforcing fiber preform. Sufficient prepolymer material is provided to impregnate the preform during a heated resin infusion phase. Typically, the RI method will include placing a barrier layer, such as a polytetrafluoroethylene barrier onto the prepolymer blend and/or prepreg material to assist in controlling the flow of resin. The perform and prepolymer blend may then be placed into a vacuum membrane or similar vacuum providing apparatus. The mold, fiber, resin, barrier layer and vacuum membrane may be placed into an autoclave or other controlled atmosphere device. The precise processing parameters utilized can vary and may depend upon the particular materials used as the first and second prepolymer components in the prepolymer blend.

In one embodiment, the temperature and pressure are increased within the autoclave, while simultaneously drawing a vacuum on the vacuum membrane. The increased temperature and vacuum facilitate the infiltration of the resin into the preform. The temperature and vacuum are maintained until the resin has sufficiently impregnated the preform to avoid the formation of voids. After infiltration, the temperature may be increased to begin crosslinking of the prepolymer blend. The specific parameters of the cure cycle vary and depend upon the particular materials used as the first and second prepolymer components in the prepolymer blend.

In another embodiment, the polyimide prepolymer blend may be processed using resin transfer molding (RTM). The materials utilized for the fiber reinforcement and the matrix are substantially the same as those used in the discussion of the RI process above. However, in RTM, an injection system is utilized to inject the prepolymer mixture into a mold by pressurization of the prepolymer mixture. The mold, which has the substantial geometry of the finished component, includes the fiber preform. The pressurized prepolymer blend impregnates the dry fibers of the fiber preform and is cured to crosslink the prepolymer mixture and form the final component. The specific parameters of the cure cycle vary and depend upon the particular materials used as the first and second prepolymer components in the prepolymer blend.

In some cases, the desired prepolymer blend (i.e., a blend that will provide desired qualities in a composite article) may not be amenable to conventional RTM or RI processing methods. Exemplary embodiments disclosed herein provide methods for obtaining the desired composite article properties, while utilizing RTM or RI techniques.

In an exemplary embodiment, the desired prepolymer blend includes first and second prepolymer components, which when suitably combined and cured will provide the desired composite article. For example, embodiments disclosed herein provide for use of one of the first or second prepolymer component as a tackifier for an RI or RTM method. For example, the preform structure may be impregnated with a suitable amount of, for example, the first prepolymer component. The first prepolymer component may have a greater molecular weight than desired for conventional RI or RTM processing and thus, standing alone, may not be suitable for use with RI or RTM techniques. However, the first prepolymer component may impart desired qualities to the fully cured polyimide composite article. In order to incorporate the desired qualities into the composite article, while employing RTM or RI techniques, the first prepolymer component is utilized as a tackifier for the preform structure. The first prepolymer component may be a mixture of monomers, a blend of oligomers, or a pre-imidized reaction product.

The preform structure, tackified with the first prepolymer component, is then infused with a suitable amount of the second prepolymer component as in conventional RTM or RI processes. The first and second prepolymer components mix during processing and react under suitable reaction conditions to provide a polyimide composite article including a crosslinked polyimide matrix supported by the preform. In this example, the polyimide composite article may exhibit enhanced properties (i.e., Tg, void content, thermal oxidative stability, tensile strength) due to the incorporation of the first prepolymer component. Of course, other combinations of prepolymer components may be utilized following the principles taught herein. For example, the second prepolymer component could be used as the tackifier, and the first prepolymer component infused into the preform structure. In other exemplary embodiments, the first and second prepolymer components may themselves be blends or mixtures of pre-polyimide components.

EXAMPLE

A prepolymer mixture was formed from a blend of dimethyl ester of 3,3', 4,4'-benzophenone tetracarboxylic dianhydride ("BTDA"), (4,4'-[1,3-phenylene bis(1-methyl-ethylidene)]bisaniline) ("Bis Aniline M" or "Bis-M"), paraphenylene diamine ("para PDA" or "pPDA"), norbornene 2,3-dicarboxylic acid ("NE") and 3,3',4,4'-biphenyl-tetracarboxylic dianhydride (BPDA). The above blend was further mixed with a solid powder second prepolymer component having a reaction product of NE, BTDA, metaphenylene diamine ("meta PDA" or "mPDA"), and Bis Aniline M.

The liquid prepolymer component included the following molar compositional concentrations of monomers: 30 mol % Bis Aniline M, 12.9 mol % p PDA, 28.6 mol % NE and varying mol % of BPDA and BTDA, as shown in TABLE 1, wherein the total mol % of the combination of BPDA and BTDA is 28.5 mol %.

A solid powder prepolymer component was added to the liquid monomer mixture in Examples 1-12. The solid powder prepolymer component included a reaction product of the following components: 40 mol % NE, 20 mol % BTDA, 28 mol % metaphenylene diamine (meta PDA), and 12 mol % Bis aniline M.

TABLE 1

MOLAR COMPOSITIONS OF EXAMPLES 1-12

| Example | BTDA | BPDA | Bis Aniline M | p PDA | NE |
|---|---|---|---|---|---|
| 1 | 24.2% | 4.3% | 30.0% | 12.9% | 28.6% |
| 2 | 24.2% | 4.3% | 30.0% | 12.9% | 28.6% |
| 3 | 24.2% | 4.3% | 30.0% | 12.9% | 28.6% |
| 4 | 21.4% | 7.1% | 30.0% | 12.9% | 28.6% |
| 5 | 21.4% | 7.1% | 30.0% | 12.9% | 28.6% |
| 6 | 21.4% | 7.1% | 30.0% | 12.9% | 28.6% |
| 7 | 24.2% | 4.3% | 30.0% | 12.9% | 28.6% |
| 8 | 24.2% | 4.3% | 30.0% | 12.9% | 28.6% |
| 9 | 24.2% | 4.3% | 30.0% | 12.9% | 28.6% |
| 10 | 21.4% | 7.1% | 30.0% | 12.9% | 28.6% |
| 11 | 21.4% | 7.1% | 30.0% | 12.9% | 28.6% |
| 12 | 21.4% | 7.1% | 30.0% | 12.9% | 28.6% |

The reaction product forming the solid powder prepolymer component was a polyimide oligomer known in the art and is commercially available as a powder. One commercially available prepolymer corresponding to the above polyimide oligomer is MM 9.36 available from Maverick Corporation, Blue Ash, Ohio.

As shown in Table 2, the solid powder prepolymer was blended with the liquid monomer prepolymer to form a mixture that has the Molecular Weight ("MW") and the structural unit size ("n") shown in the Examples. Examples 1-6 included a MW of 2100 g/mol and a structural unit size of 3. Examples 7-12 included a MW of 1600 g/mol and a structural unit size of 2. The ratio between BTDA and BPDA was varied as shown in Table 1 and the amount of powder added was varied, as shown in TABLE 2.

The mixture was cured at a temperature of about 600° F. (316° C.) and a pressure of 200 psi for 4 hours. The glass transition temperature ("Tg") for the cured Examples are shown in TABLE 3. The cured sample was then subjected to a one of 2 post cures. The first post cure includes exposing the sample to a temperature of about 600° F. (316° F.) at ambient pressure for 12 hours. The Tg values for the first post cured Examples are shown in TABLE 3. The second post cure includes exposing the sample to a temperature of about 625° F. (329° C.) at ambient pressure for 12 hrs. The Tg values for the second post cured Examples are shown in TABLE 3.

In addition to the post curing, the samples were also measured for thermal oxidative stability (TOS). The TOS for Examples 1-12 are shown in TABLE 4. Likewise, the compression strength of the samples was measured after subjecting the samples to thermal cycling from room temperature to 550° F. (288° C.) for 380 cycles. The compression data is shown in TABLE 4.

As shown in Examples 1, 4, 7 and 10, a lower Tg and a higher TOS weight loss result from the presence of the liquid monomer mixture alone. The mixture of the liquid prepolymer component with the solid prepolymer component resulted in a Tg of greater than about 500° F. (260° C.) in the cured state and a thermal oxidative stability having a TOS weight loss of less than 2.0%. In the post cured state, the Tg of Examples reached 600° F. (316° C.) or greater.

TABLE 2

TAILORABLE POLYIMIDE RESINS NADIC END CAP

| Example | Liquid Formulated MW (g/mol) | n = | Monomer Substitution in Liquid Prepolymer Component** | Powder Prepolymer Component Addition |
|---|---|---|---|---|
| 1 | 2100 | 3 | 15% | 0% |
| 2 | 2100 | 3 | 15% | 15% |
| 3 | 2100 | 3 | 15% | 30% |
| 4 | 2100 | 3 | 25% | 0% |
| 5 | 2100 | 3 | 25% | 15% |
| 6 | 2100 | 3 | 25% | 30% |
| 7 | 1600 | 2 | 15% | 0% |
| 8 | 1600 | 2 | 15% | 15% |
| 9 | 1600 | 2 | 15% | 30% |
| 10 | 1600 | 2 | 25% | 0% |
| 11 | 1600 | 2 | 25% | 15% |
| 12 | 1600 | 2 | 25% | 30% |

**percent of BTDA substituted by BPDA in liquid formulated Resin

MM 9.36 powder resin

MW = 936

TABLE 3

GLASS TRANSITION TEMPERATURE

| Example | As Cured Tg (° F.) | Post Cure 1 Tg (° F.) | Post Cure 2 Tg (° F.) |
| --- | --- | --- | --- |
| 1 | 478 | 530 | 551 |
| 2 | 501 | 551 | 589 |
| 3 | 530 | 576 | 595 |
| 4 | 488 | 531 | 553 |
| 5 | 500 | 556 | 583 |
| 6 | 532 | 579 | 606 |
| 7 | 514 | 552 | 563 |
| 8 | 520 | 561 | 590 |
| 9 | 545 | 580 | 606 |
| 10 | 501 | 552 | 578 |
| 11 | 516 | 572 | 590 |
| 12 | 532 | 584 | 609 |

TABLE 4

| Example | THERMAL OXIDATIVE STABILITY TOS Weight Loss (%) | COMPRESSION STRENGTH Compression (ksi) |
| --- | --- | --- |
| 1 | 4.83 | 56.95 |
| 2 | 1.42 | 89.75 |
| 3 | 1.62 | 78.94 |
| 4 | 2.23 | 78.87 |
| 5 | 1.39 | 85.16 |
| 6 | 1.84 | 75.67 |
| 7 | 2.8 | 90.57 |
| 8 | 1.54 | 94.09 |
| 9 | 1.91 | 92.9 |
| 10 | 1.25 | 97.76 |
| 11 | 1.44 | 98.19 |
| 12 | 1.67 | 91.61 |

Exemplary composite structures formed from tailorable polyimide resin systems as disclosed herein may be coated with exemplary thermal oxidative barrier coating systems to provide opportunities for a variety of high temperature applications. Such a coating system may utilize a tailorable polyimide resin system in the bond coat. The bond coat may be further modified by nanofillers as discussed above.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An article comprising:
   an organic matrix composite substrate; and
   a thermal oxidative barrier coating on at least one surface of the substrate;
   wherein the organic matrix composite substrate comprises a first polyimide matrix formed by curing under suitable cure conditions, a polyimide precursor blend comprising a first prepolymer component and a second prepolymer component, wherein the first and second prepolymer components independently comprise a monomeric mixture, a reaction product of a monomeric mixture, or a combination thereof, wherein each monomeric mixture includes a diamine component, a dianhydride component, and an end group component;
   wherein the thermal oxidative barrier coating includes at least a bond coat disposed on the at least one surface of the substrate and at least one thermal barrier layer substantially overlying the bond coat;
   wherein the bond coat comprises nano-particles carried in a second polyimide matrix; and
   wherein the at least one thermal barrier layer comprises at least one member selected from the group consisting of a silsesquioxane and an inorganic polymer.

2. The article according to claim 1 wherein the nano-particles comprise at least one member of the group consisting of clay platelets, graphite flakes, and polyhedral oligomeric silsesquioxanes.

3. The article according to claim 1 wherein the monomeric mixture of the first prepolymer component includes a monomethyl ester of 5-norbornene 2,3-dicarboxylic acid (NE), derivatives thereof and mixtures thereof; 3,4,3',4'-benzophenonetetracarboxylic dianhydride (BTDA), derivatives thereof and mixtures thereof; m-PDA; and 4,4'-(1,3-phenylene-bis(1-methylethylidene))bisaniline (Bis-M), derivatives thereof and mixtures thereof.

4. The article according to claim 1 wherein the monomeric mixture of the second prepolymer component includes a monomethyl ester of 5-norbornene 2,3-dicarboxylic acid (NE), derivatives thereof and mixtures thereof; 1,4-phenylenediamine (p-PDA); 4,4'-(1,3-phenylene-bis(1-methylethylidene))bisaniline (Bis-M), derivatives thereof and mixtures thereof; 3,4,3',4'-biphenyltetracarboxylic dianhydride (BPDA), derivatives thereof and mixtures thereof; and 3,4,3',4'-benzophenonetetracarboxylic dianhydride (BTDA), derivatives thereof and mixtures thereof.

5. The article according to claim 1 wherein:
   the monomeric mixture of the first prepolymer component includes a monomethyl ester of 5-norbornene 2,3-dicarboxylic acid (NE), derivatives thereof and mixtures thereof; 3,4,3',4'-benzophenonetetracarboxylic dianhydride (BTDA), derivatives thereof and mixtures thereof; m-PDA; and 4,4'-(1,3-phenylene-bis(1-methylethylidene))bisaniline (Bis-M), derivatives thereof and mixtures thereof;
   and,
   the monomeric mixture of the second prepolymer component includes a monomethyl ester of 5-norbornene 2,3-dicarboxylic acid (NE), derivatives thereof and mixtures thereof; 1,4-phenylenediamine (p-PDA); 4,4'-(1,3-phenylene-bis(1-methylethylidene))bisaniline (Bis-M), derivatives thereof and mixtures thereof; 3,4,3',4'-biphenyltetracarboxylic dianhydride (BPDA), derivatives thereof and mixtures thereof; and 3,4,3',4'-benzophenonetetracarboxylic dianhydride (BTDA), derivatives thereof and mixtures thereof.

6. The article according to claim 1 wherein the monomeric mixture of the first prepolymer component includes about 40 mol % monomethyl ester of 5-norbornene 2,3-dicarboxylic acid (NE), derivatives thereof and mixtures thereof about 20 mol % 3,4,3',4'-benzophenonetetracarboxylic dianhydride (BTDA), derivatives thereof and mixtures thereof about 28 mol % m-PDA, derivatives thereof and mixtures thereof and about 12 mol % 4,4'-(1,3-phenylene-bis(1-methylethylidene))bisaniline (bisaniline-M), derivatives thereof and mixtures thereof and wherein the monomeric mixture of the second prepolymer component includes about 30 mol % 4,4'-(1,3-phenylene-bis(1-methylethylidene))bisaniline (Bis-M), derivatives thereof and mixtures thereof about 12.9 mol % 1,4-phenylenediamine (p-PDA), derivatives thereof and mixtures thereof about 28.6 mol % monomethyl ester of 5-norbornene 2,3-dicarboxylic acid (NE), derivatives thereof and mixtures thereof and about 28.5 mol % total of 3,4,3',4'-biphenyltetracarboxylic dianhydride (BPDA) and 3,4,3',4'-benzophenonetetracarboxylic dianhydride (BTDA), derivatives thereof and mixtures thereof.

7. The article according to claim 1 wherein the second polyimide matrix comprises first and second prepolymer components substantially similar to the first and second prepolymer components of the first polyimide matrix.

8. The article according to claim 1 wherein:

the first prepolymer component comprises the reaction product of at least one dianhydride selected from 2,3-3',4'-biphenyltetracarboxylic dianhydride (a-BPDA), derivatives thereof, and mixtures thereof, at least one diamine selected from an amino phenoxy benzene (APB), metaphenylene diamine (meta-PDA), derivatives thereof, and mixtures thereof, and an end group selected from phenyl ethynyl phthalic anhydride (PEPA), derivatives thereof, and mixtures thereof; and the second prepolymer component comprises the monomeric mixture wherein the dianhydride component is at least one member of the group consisting of a pyromellitic dianhydride, 3,4,3',4'-biphenyltetracarboxylic dianhydride (BPDA), 3,4,3',4'-benzophenonetetracarboxylic dianhydride (BTDA), derivatives thereof, and mixtures thereof, the diamine component is at least one member of the group consisting of 1,4-phenylenediamine (para-PDA), amino phenoxy benzene (APB), derivatives thereof, and mixtures thereof, and the end group component is at least one member of the group consisting of phenyl ethynyl phthalic anhydride (PEPA), derivatives thereof, and mixtures thereof.

9. The article according to claim 1 wherein the article comprises a component for a gas turbine engine.

10. The article according to claim 9 wherein the gas turbine engine component is at least one of a flow path duct, a liner, a tube, a flap, an airfoil, and a frame.

11. The article according to claim 1 wherein the first polyimide matrix has a glass transition temperature of at least about 450° F. (232° C.).

12. The article according to claim 1 wherein the first polyimide matrix has a glass transition temperature of at least about 550° F. (288° C.).

13. The article according to claim 1 wherein the thermal oxidative barrier coating is operative to provide at least a 100° F. (56° C.) reduction in temperature exposure at the at least one surface of the substrate in a service temperature environment of up to about 725° F. (385° C.).

14. The article according to claim 1 wherein the at least one thermal barrier layer includes a two-part silsesquioxane/titanate material.

15. The article according to claim 1 wherein the at least one thermal barrier layer includes the inorganic polymer comprising a poly(sialate) material.

* * * * *